United States Patent Office 3,395,686
Patented Aug. 6, 1968

3,395,686
BLOCKING OSCILLATOR CIRCUIT AND CAPACITOR DISCHARGE IGNITION SYSTEM EMPLOYING THE BLOCKING OSCILLATOR CIRCUIT
Floyd M. Minks, Campbellsport, Wis., assignor, by mesne assignments, to Brunswick Corporation, Chicago, Ill., a corporation of Delaware
Filed Nov. 3, 1966, Ser. No. 591,910
25 Claims. (Cl. 123—148)

ABSTRACT OF THE DISCLOSURE

A capacitor discharge type of ignition system for an internal combustion engine is provided with blocking oscillator for charging the capacitor. A pulse generating means is inductively coupled to trigger a switching means to discharge the capacitor through a circuit including an ignition coil and to trigger a switching means to initiate operation of the blocking oscillator in a sequential manner.

Figure 1:
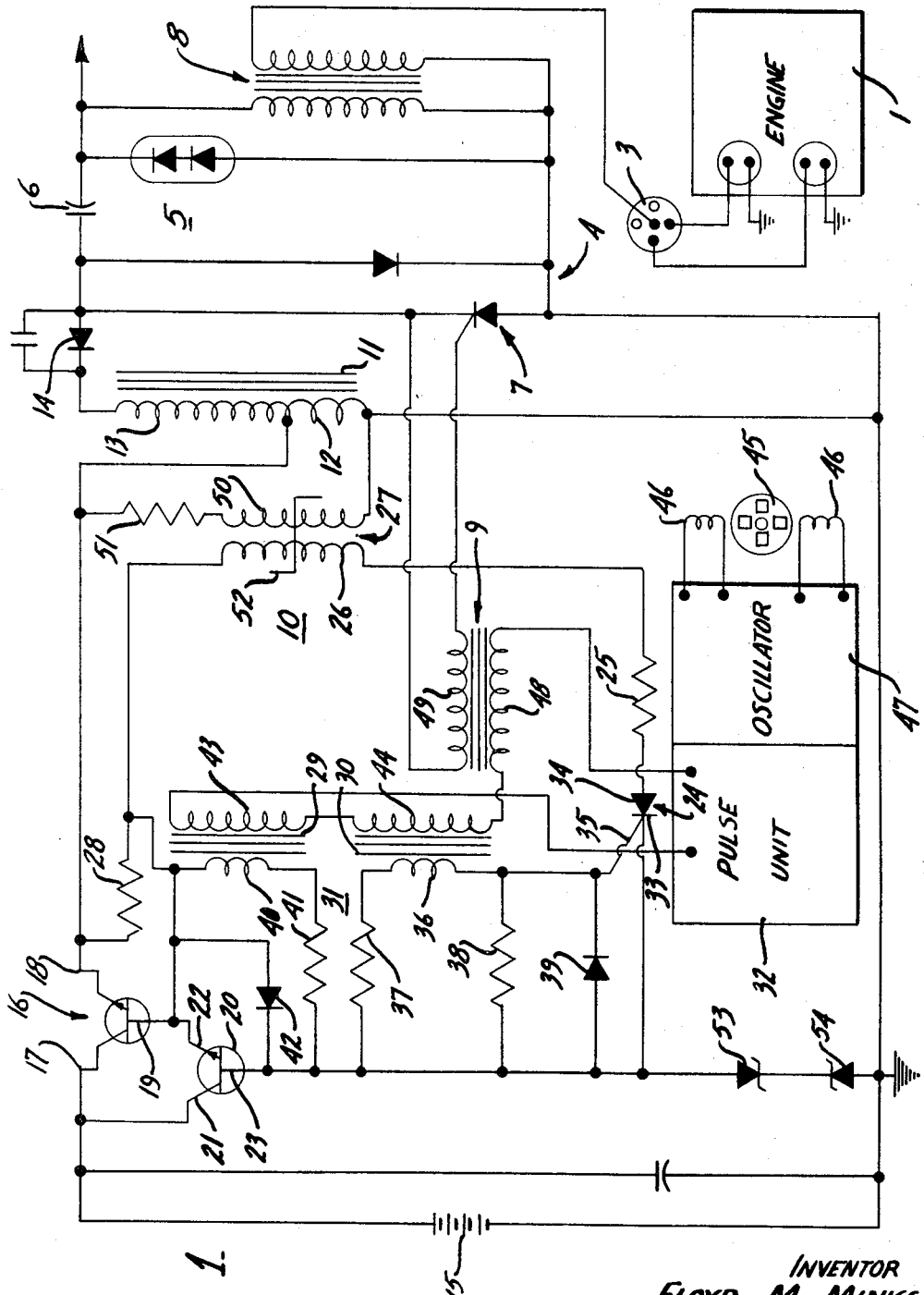

This invention relates to a blocking oscillator circuit and particularly to a highly efficient blocking oscillator circuit forming a part of a capacitor discharge ignition system for internal-combustion engines and the like.

Capacitor discharge systems for internal-combustion engines and the like have been suggested wherein a capacitor is alternately charged from a battery and/or the generator and rapidly discharged through an induction transformer to fire the spark plugs. A highly satisfactory capacitor discharge ignition system is shown in applicant's copending application entitled Controlled Electrical Pulse Source which was filed on Oct. 4, 1965 with Ser. No. 492,570 and which is assigned to the same assignee as the present application. As more fully disclosed in that application, a blocking oscillator is employed including a transistor as a control switch in series with the primary of the charging winding of the inductor. The feedback loop circuit includes a magnetic core control unit having a winding connected in the feedback loop. The core is preferably a square loop type core material; i.e. one essentially having a rectangular magnetic characteristic. During the time energy is being stored in the blocking oscillator inductor, voltage is applied to the winding of the magnetic core unit. When the core reaches the saturation area, the permeability of the core unit changes rapidly thus interrupting the feedback loop of the blocking oscillator. The resultant decay in the flux of the charging inductor reverses the polarity of the charging winding and the output winding at which time the energy stored in the inductor is transferred to the capacitor. The reverse polarity is also reflected in the magnetic core control unit and resets the core. This provides a highly improved operation with a predetermined controlled energy per pulse essentially independent of battery voltage and engine speed. Circuits as shown therein most readily employ a germanium type transistor. Although they are highly satisfactory, they do present certain problems as a result of thermal limitations.

The present invention is particularly directed to an improved capacitor discharge ignition system employing high temperature transistors such as commercially available silicon transistors connected in a highly efficient blocking oscillator circuit.

Generally, in accordance with the present invention, the capacitor discharge system employs a blocking oscillator with the usual storage and transfer inductor. The inductor charging circuit employs a silicon transistor or other similar semiconductor device connected in series with the storage winding of the inductor. A second transistor is connected in the input circuit with the first transistor. A feedback circuit for the transistors includes a silicon controlled rectifier connected in series with a saturable transformer.

A turn-on or input circuit simultaneously biases the transistors and the silicon controlled rectifiers into conduction. The turn-on circuit preferably includes separate pulse circuits for the second transistor and for the silicon controlled rectifier gate. The pulse circuits include separate pulse transformers having the individual secondary windings connected in the corresponding individual turn-on or firing circuits. The primary windings are interconnected in series with each other to a pulse forming system.

The saturable transformer serves to terminate a charging cycle in the same manner as disclosed in applicant's previously referred to application. However, the turn-off inductor is preferably formed as a transformer having a separate winding to obtain D.C. isolation in the feedback loop.

The capacitor discharge circuit preferably also includes a silicon controlled rectifier having a pulse transformer connected in the gate circuit for triggering thereof. The last mentioned silicon controlled rectifier pulse transformer includes a primary winding connected in series with the primary windings of the blocking oscillator trigger pulse transformers. Depending on the source available, two or more of the windings may be connected in parallel.

In accordance with another aspect of the invention, overvoltage protection is provided by the Zener diode or the like connected in series with the input elements of the transistors across the primary winding of the energy storage inductor. During the inductor discharge cycle of the oscillator, the capacitor voltage is reflected through the charging winding directly across the transistors in series with the Zener diode. If the voltage rises above a selected level, the Zener diode conducts, biasing the transistors to conduct and thereby dissipating the excess energy. The silicon transistors of the oscillator circuit dissipate the necessary energy. The blocking diode and Zener diode are relatively small inexpensive components and thus provide highly practical overvoltage protection. These components are not part of the normally functioning energy regulation system and function to protect the system if for example a coil primary lead is removed.

The present invention thus provides a highly improved blocking oscillator circuit having a reliable and long life over wide temperature ranges.

The drawing furnished herewith illustrates a preferred construction of the present invention in which the above advantages and features are clearly disclosed as well as others which will be clear from the following description.

Figure 2:
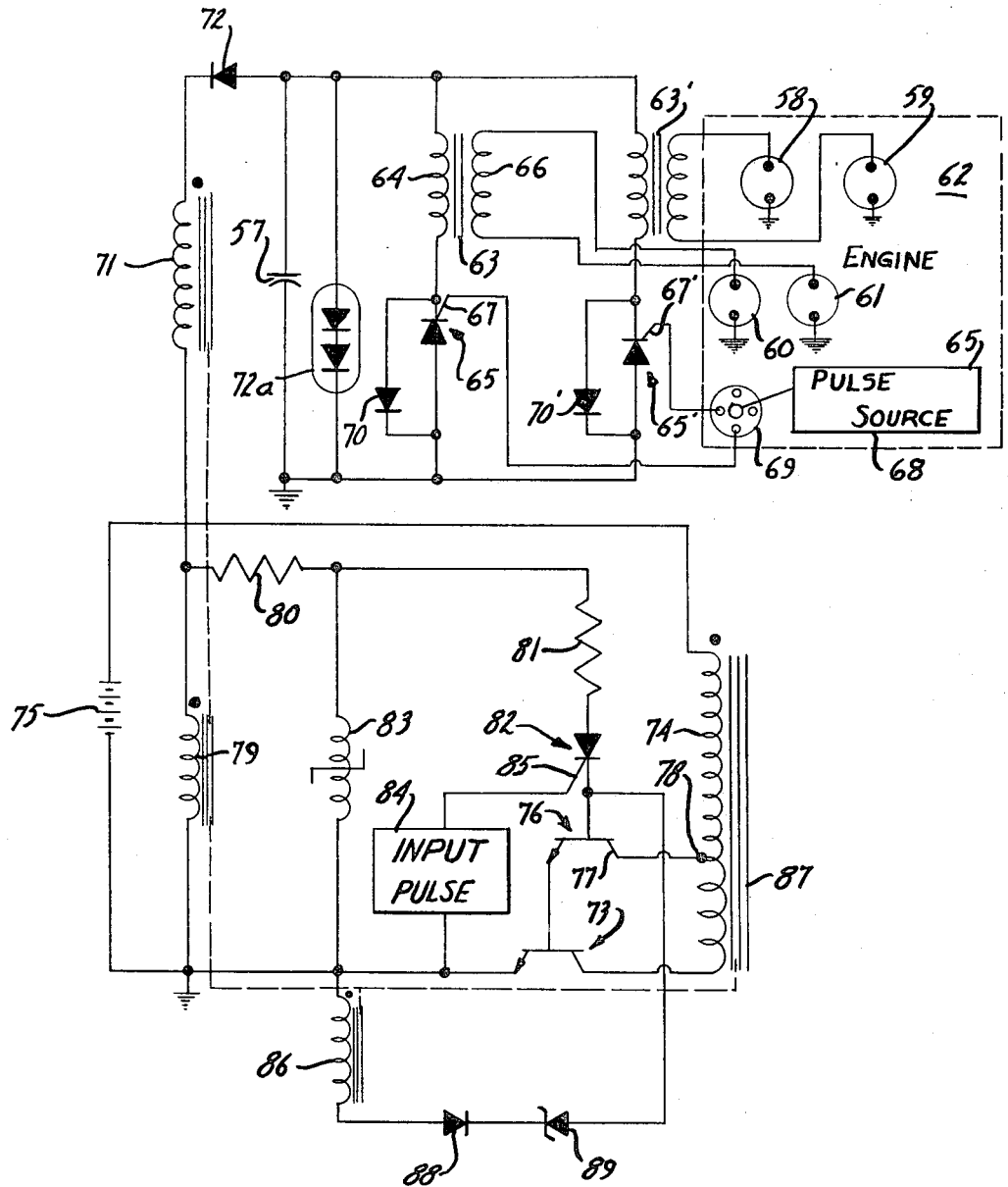

In the drawing:

FIG. 1 is a schematic circuit diagram of a capacitor discharge ignition unit employing a blocking oscillator constructed in accordance with the present invention; and FIG. 2 is a similar schematic circuit showing an alternative construction of the blocking oscillator.

Referring to the drawing and particularly to FIG. 1, an internal-combustion engine 1 is diagrammatically shown having a plurality of spark plugs 2 interconnected to the output side of a distributor 3 for sequential interconnection to the output side of a capacitor discharge ignition system 4 which is constructed in accordance with the present invention. Generally, the illustrated capacitor discharge ignition system 4 includes an output circuit 5 similar to that of applicant's previously referred to application. Generally, the output circuit includes a storage capacitor 6 interconnected in series with a control switch shown as a known silicon controlled rectifier 7 and a pulse transformer 8. The output of the transformer 8 is connected to the spark plugs 2 by the distributor 3.

A trigger transformer 9 is connected in the gate circuit of the rectifier 7 to control the firing thereof and the discharging of the capacitor 6 through transformer 8 in timed relation to the operation of the engine for proper firing of the spark plugs 2.

The capacitor 6 is charged through the output of a blocking oscillator 10 particularly forming the subject matter of the present invention. The oscillator 10 generally includes an energy storage inductor 11 shown as an autotransformer having a charging winding section 12 and an output winding section 13. A diode 14 is connected in series with the output winding 13 and the capacitor 6 to prevent charging of the capacitor during the energy charging cycle of the inductor, as more fully developed hereinafter.

The input to the blocking oscillator 10 is shown as a battery 15 which may be a suitable low voltage unit having a suitable rated output voltage such as 6, 12 or 24 volts all of which are presently widely employed in automobiles, trucks, outboard motors and other similar internal-combustion applications. A charging control or switching transistor 16 is connected in series with the battery 15 and the charging winding 12 to conduct during a charging cycle and to cut off during the energy transfer portion of the cycle. The switching transistor 16 is shown as an NPN variety and preferably a silicon type such as commercially available under the type 2N3772.

It will be understood of course by those skilled in the art that a PNP type transistor could be readily employed with proper interconnection of the elements.

The transistor 16 includes a collector 17 connected to the positive side of the battery and an emitter 18 connected directly to the one side of the charging winding 12 of the inductor 11 and therethrough back to the negative or grounded side of the battery. The base 19 is connected in an input circuit through a control transistor 20 which is of a similar variety shown as an NPN. The collector 21 is connected to the collector 17 of the transistor 16 and the emitter 22 is connected to the base 19. The base 23 of the transistor 20 is connected in series with a start silicon controlled rectifier 24, a limiting resistor 25 and the output or secondary winding 26 of a saturable reactor feedback transformer 27 to the emitter 22 and common connected base 19 of transistors 20 and 16, respectively. The base 19 and emitter 22 are also connected in series with a stabilizing resistor 28 to the emitter 18 of the transistors 16. This differs from the well known "Darlington" connection of two transistors in that the required input voltage is much lower than that between the base of the low power transistor and the emitter of the high power transistor as in the Darlington.

In the illustrated embodiment of the invention, a pair of trigger transformers 29 and 30 is provided as a part of an input control circuit 31 for the transistors 16 and 20 and function to initiate conduction as a result of receiving a pulse from an input trigger pulse unit 32.

The transistor 20 and the rectifier 24 are simultaneously biased on to initiate a cycle by the pulsed energization of transformers 29 and 30, as follows.

The base 23 of the transistor 20 is connected directly to the cathode 33 of the silicon controlled rectifier 24. The anode 34 is connected to the resistor 25. The gate 35 is connected in series with the secondary winding 36 of the pulse transformer 30 and a resistor 37 to the cathode 33. A stabilizing resistor 38 in parallel with a diode 39 is connected between the gate 35 and the cathode 33 of the rectifier 24.

This provides a firing circuit for the silicon controlled rectifier 24 such that whenever the transformer 30 is pulsed with a proper polarity as shown, the silicon controlled rectifier 24 is biased to conduct.

The secondary winding 40 of the pulse transformer 29 is similarly connected in series with a resistor 41 between the base 23 and the emitter 22 of the transistor 20. A diode 42 is connected directly across the emitter to base circuit of the transistor 20.

The primary winding 43 of transformer 29 and the primary windings 44 of the transformer 30 are coupled to the respective secondaries 40 and 36 and wound to provide the indicated polarity during the receiving of a pulse from the pulse unit 20. Windings 43 and 44 are connected in series to the pulse forming unit 20.

Generally, the pulse unit 32 produces pulses in synchronism with the operation of the engine and distributor in any suitable manner. A highly satisfactory system is shown in applicant's copending application wherein a rotating vane 45 is coupled to the distributor and selectively controls the coupling of the windings 46 of an oscillator 47 to generate firing pulses. It is sufficient to note here that the rotation of the apertured vane 45 results in a train of pulse signals in timed relation with the rotation of the engine 1 and thus provides for trigger pulses to the trigger transformers 29 and 30 to initiate a charging cycle of the blocking oscillator.

The saturable reactor transformer 27 interconnects the output of the blocking oscillator to the input circuit 31 to control the length of time transistors 16 and 20 are conducting.

A primary winding 48, of the main silicon controlled rectifier trigger transformer 9, is also connected in series with the windings 43 and 44. The secondary 49 is connected to the gate of rectifier 7 and simultaneously with initiation of a charging cycle of oscillator 10 the capacitor 6 discharges through pulse transformer 8.

In the illustrated embodiment of the invention, the saturable transformer 27 includes a primary winding 50 connected in series with a resistor 51 across the charging winding 12. The primary winding 50 is wound on a square loop core 52 which in turn carries the secondary winding 26 connected in the circuit of the silicon controlled rectifier 24 as previously described.

The use of the saturable core unit as a transformer allows the turn ratio to be selected to minimize power losses in the feedback system and allows the interconnection of transistors 16 and 20 in a 4-terminal network rather than the less efficient 3-terminal Darlington configuration.

The resistor 51 may be formed of a high temperature coefficient wire to provide a more constant output with temperature.

During the discharging cycle, the voltage of capacitor 6 is reflected into the blocking oscillator circuit through the transformer 11. In order to protect against abnormally high voltages, the present invention provides a small Zener diode 53 in series with a blocking diode 54 connected between the base of the transistor 20 and the ground or common line to the negative side of the battery 15. Thus, during the reverse cycle, a voltage proportional to the charge on the capacitor 6 is reflected into the oscillator circuit and applied directly across the series connected emitter input circuits of the transistors 16 and 20 and the Zener diode 53. If the voltage reaches the avalanche level of the Zener diode 53, the diode 53 will conduct and energy is dissipated in the silicon transistors 16 and 20. The battery circuit will also then be completed and result in slight dissipation of energy from the battery. The small Zener diode 53 provides a very simple and reliable means for dissipating and limiting the output voltage under such unusual conditions as when a coil primary lead is loose or broken.

The operating cycle of the circuit may be summarized as follows. The rotating vane 45 actuates the pulse forming unit 20 to generate a pulse which is simultaneously applied to the three pulse transformers 9, 29 and 30.

The energization of the pulse transformer 9 fires the main silicon controlled rectifier 7 discharging the capacitor 6 which was charged during a previous blocking oscillator cycle. Simultaneously, the pulses to the transformers 29 and 30 fire the silicon controlled rectifier 24 and bias the transistor 20 to conduct. This drives the transistor 16 into conduction and consequently current is drawn from the battery 15, through the transistor 16 and the charging winding 12 of the inductor 11. Simultaneously, current is diverted through the saturable transformer 27 to maintain the transistors 16 and 20 in an on-state.

The interconnected transistors 16 and 20 provide a very high gain feedback circuit for the blocking oscillator 10 as a result of the driving of single transistor 20. The base to emitter voltage of the transistor 20 may be in the order of eight-tenths of a volt whereas that of the transistors 16 may be in the order of 1.6 volts. The system is driven with the same input current but with essentially one-third of the voltage and consequently only one-third of the power requirements. This contributes to a highly efficient system, capable of giving substantial outputs even at low battery input voltage. Typical output is —3 db with a battery voltage of 3.2 volts into a system normally operating from a 14 volt input.

Referring particularly to FIG. 2, an alternative embodiment of the present invention is disclosed in which a pair of transistors 55 and 56 are generally interconnected in a compound type arrangement as the switching element of a blocking oscillator to provide charging of a capacitor 57 which in turn is sequentially discharged through a plurality of paralleled firing stages for sequential firing of four spark plugs 58, 59, 60 and 61 in an internal-combustion engine 62.

In the embodiment of the invention illustrated in FIG. 2, the spark plugs 58–61 are connected to the capacitor-57 through paralleled branch circuits, each branch circuit including a pulse transformer 63 having a primary 64 in series with a silicon controlled rectifier 65. The elements of the one branch circuit are identified by primed numbers.

The secondaries 66 and 66' of transformer 63 and 63' are connected respectively to the ungrounded side of the spark plugs 58 and 59 and of spark plugs 60 and 61.

Normally, the spark plugs 58 and 59 are paired for simultaneous firing in accordance with related pairs of cylinders in the multiple cylinder internal-combustion engine 62. When the one cylinder is fired to establish a working stroke, the related second cylinder is operating in the exhaust or return stroke. Although both plugs 58 and 59 are simultaneously fired, the firing of the spark plug of the cylinder in the exhaust stroke mode will have no appreciable effect and the simultaneous firing is therefore entirely permissible, if desired. Spark plugs 60 and 61 are similarly correspondingly fired.

The advantage of the above output or firing circuit primarily is related to the elimination of the conventional distributor with the associated high voltage switching.

The gates 67 of the silicon controlled rectifiers 65 and 65' are interconnected to a suitable pulse means to provide timed firing of the rectifier 65. Thus, a plurality of means such as described for proper firing of the blocking oscillator may provide properly time spaced pulses. For purposes of illustration, a pulse source 68 through a sequencing means 69 which is operated in timed relation to the engine 60 is shown to provide sequential firing of the silicon controlled rectifiers in timed relation to the operation of the engine. In this manner, the proper silicon controlled rectifier 65 and 65' is fired to supply a voltage pulse to the associated spark plugs in the proper timed relation.

In the embodiment of FIG. 2, a separate diode 70 is preferably connected in parallel with each of the individual silicon controlled rectifiers to protect them against extraneous and transient voltages which may be generated within the pulse transformers 63 and 63', particularly where the device is operated with the pulse transformers on open circuit condition.

The illustrated output circuit of the blocking oscillator includes capacitor 57 interconnected to an output winding 71 of a blocking oscillator inductor in series with a blocking diode 72. A stabistor, or a single diode 72a, may be connected in parallel with the capacitor as in FIG. 1.

The illustrated embodiment of the invention of the blocking oscillator includes a first switching transistor 73 connected in circuit with a charging winding 74 to the battery 75. A second transistor 76 has its emitter-collector terminals connected between the base and collector of the main transistor, generally similar to that disclosed in the embodiment of FIG. 1. In the embodiment of FIG. 2, however, the collector 71 of the second transistor 76 is connected to a tap 78 on the charging winding 74 to insert a few number of turns of the charging winding between the two collectors. This provides compensation for the relatively large saturation voltage drops normally associated with the high current transistors.

Further, in the embodiment of FIG. 2, a feedback winding 79 is connected in series with a pair of voltage dividing resistors 80 and 81 and a silicon controlled rectifier 82 to the base of the second transistor 76 and the emitter of the first transistor 73.

A turn-off inductor 83 is wound on a square loop core or the like and connected between the junction of the resistors 80 and 81 and the emitter of the first transistor 73. Consequently, when the inductor saturates, an effective shunt circuit around the feedback winding 79 is established to bypass the feedback loop from the transistors and turn off the switch.

In the embodiment of FIG. 2, the input to turn on the oscillator is shown in block diagram as a pulse source 84 connected directly between the gate 85 of the silicon controlled rectifier 82 and the emitter of the switching transistor 73. In this case, the input pulse must of sufficient magnitude to simultaneously bias the silicon controlled rectifier 82 and both of transistors 73 and 76 to the on state. If desired, the starting circuit of FIG. 1 may be employed.

The circuit is provided with an overvoltage protection system including a separate winding 86 wound on the same core 87, as shown by the phantom line connection, with the windings 71, 74 and 79. Winding 86 is interconnected in series with a blocking diode 88 and a Zener diode 89 across the two transistor inputs in series. If the reflected voltage increases above a desired level, the transistors 73 and 76 are biased to an on condition to function in the same manner, as previously described, to conduct and dissipate the energy.

The embodiment of the invention illustrated in FIG. 2 may be desirable under certain conditions particularly where the device is to operate at a relatively constant given input voltage. Thus, the transformer tap 78 interconnecting the collectors of the transistors 73 and 76 provides high efficiency at a given input voltage. As the voltage varies therefrom, the efficiency will decrease because the saturation voltages are no longer equal to the voltage of tap 78. As the input voltage increases there will be relatively large dissipation of energy in the transistor 77 thereby reducing the efficiency.

The present invention provides an extremely efficient, reliable and long life ignition system and has been found to be a particularly satisfactory ignition system for outboard motors.

Various modes of carrying out the invention are contemplated as being within the scope of the following claims particularly pointing out and distinctly claiming the subject matter which is regarded as the invention.

I claim:
1. In a capacitor discharge ignition system,
a capacitor charging circuit including an inductor having a charging winding and an output winding and first and second transistors, said charging winding being connected in a charging circuit including the first transistor, the second transistor having output elements connected in series with the input elements of the first transistor and the power supply means and the charging winding, said second transistor having input elements, a capacitor connected in a capacitor charging circuit including said output winding and an output circuit including an electronic switch means, and a pulse source means connected to bias said transistors to conduct.

2. The capacitor discharge ignition system of claim 1 wherein said transistors are both NPN or both PNP, the emitter to collector circuit of the first transistor being connected in series with the winding in said charging circuit and the base to emitter circuit of the first transistor and the collector to emitter circuit of the second transistor being connected in series in said charging circuit, and said pulse source means is connected across the base to emitter circuit of only said second transistor.

3. In the capacitor discharge ignition system of claim 1, including a triggered control rectifier means, a saturable feedback winding transformer having a primary winding connected in parallel with the charging winding and a secondary winding connected to said input circuits in series with each other and with the triggered control rectifier means, said rectifier means being turned off in response to the saturation of the feedback winding.

4. The capacitor discharge ignition system of claim 3, having means connected to bias said triggered switch means on simultaneously with said first transistor.

5. The capacitor discharge ignition system of claim 1, having a second electronic switch means having an input means, a feedback means connected in a feedback loop circuit including the input elements of said transistors and said second electronic switch means, three pulse transformers having the primary windings connected in series and having three related secondaries connected one to the input elements of the first transistor, one to the input means of the first electronic switch means and one to the input means of the second electronic switch means.

6. The capacitor discharge ignition system of claim 5, wherein said second electronic switch means is a controlled rectifier having a gate to cathode circuit in series with the corresponding secondary, a diode connected across the gate to cathode circuit, a resistor connected in parallel with the diode, and a diode connected across the input elements of the second transistor.

7. The capacitor discharge system of claim 1, having a second electronic switch means having an input means, a feedback transformer having a winding connected in a feedback loop circuit including the input elements of said transistors and said second electronic switch means, said transformer having an input winding connected across the charging winding, three pulse transformers having the primary windings connected in series and having three related secondaries connected one to the input elements of the first transistor, one to the input means of the first electronic switch means and one to the input means of the second triggered switch means.

8. The capacitor discharge ignition system of claim 7, having a high temperature coefficient resistor in series with said primary winding.

9. The capacitor discharge ignition system of claim 1, wherein the first transistor has the emitter-collector circuit connected in series with the charging winding and the base-emitter circuit connected in series with the emitter-collector circuit of the second transistor, a first trigger transformer having a secondary connected across the base-emitter of the second transistor in series with an impedance, a blocking diode connected across the base-emitter of the second transistor, a saturating feedback transformer having a primary connected in parallel with the charging winding and secondary, a controlled rectifier connected in series with the secondary and the base-emitter of the second transistor, a second trigger transformer having a secondary connected to the controlled rectifier and having a primary winding, and a pulse source connected in series with the primaries to simultaneously pulse said transformers.

10. The capacitor discharge ignition system of claim 9, wherein said primaries are connected in series.

11. In the capacitor discharge ignition system of claim 1, having a protective voltage breakdown means connected in series with the input elements of the transistors and the charging winding, said breakdown means being back biased by the voltage during an inductor discharging cycle and conducting in response to a selected voltage after which said transistors conduct to dissipate energy.

12. The capacitor discharge ignition system of claim 11 wherein said breakdown means is a Zener diode and a blocking diode in series.

13. In a capacitor discharge ignition system, a blocking oscillator having an inductor connected in a charging circuit and a discharging circuit, said charging circuit including an amplifying means normally conductive only during a charging portion of a cycle of the oscillator, and a protective circuit means connected to bias said amplifying means to conduct in response to an output voltage in the discharging circuit above a selected level whereby the stored energy is discharged through said amplifying means.

14. A blocking oscillator including, power supply connection means, first and second transistors, each having input elements and output elements, an energy storage inductor connected in a circuit including the first transistor and the power supply connection means, the second transistor having output elements connected in series with the input element of the first transistor and the power supply connection means and said energy storage inductor, said second transistor having input elements, and a feedback transistor means connected to only the input elements of the second transistor to bias said transistors to conduct and establish current flow through said first winding and said feedback transformer.

15. The oscillator of claim 14 having a separate pulse source means connected to the input element of only said second transistor to bias it to conduct and thereby initiate oscillation.

16. The oscillator of claim 14 including a triggered control rectifier means, said feedback transformer having a generally square loop characteristic and having a primary winding connected in parallel with the energy storage inductor and a secondary winding connected in series with the input elements of said second transistor and the triggered control rectifier means, said rectifier means being turned off in response to the saturation of the feedback winding, and separate means connected to bias said triggered switch means on simultaneously with said second transistor.

17. An oscillator, comprising a transformer having a primary winding, first and second transistors, said first transistor having an emitter-collector circuit connected in series with the winding and a base-emitter circuit connected in series with an emitter-collector circuit of the second transistor, a first trigger transformer having a secondary connected across a base-emitter of the second transistor in series with an impedance, a blocking diode connected across the base-emitter of the second transistor, a feedback transformer having a square loop characteristic and having a primary connected in parallel with the primary winding and having a secondary, a controlled rectifier having an input means and having an output means connected in series with the secondary of the feedback transformer and the base-emitter of the second transistor, a second trigger transformer having a secondary connected in series with an impedance to the input means of the controlled rectifier and having a primary winding, a diode means connected in parallel with said input means of the rectifier and the series connection of the impedance and the secondary of the second trigger transformer, and a pulse source connected to the primaries of said trigger transformers to simultaneously pulse said transformers.

18. An oscillator comprising,
   power connection means,
   an amplifying means having an input means and an output means connected in an output circuit,
   a controlled rectifier having a firing means and an output means,
   a transformer having a primary winding connected in series with the amplifying means and the power connection means and a secondary winding connected in series with the input means of the amplifying means and the output means of the controlled rectifier, and
   pulse transformer means having secondary windings connected respectively to the input means of the amplifying means and of the controlled rectifier.

19. The oscillator of claim 18 wherein said pulse transformer means includes a pair of transformers having the primary windings connected in series.

20. The oscillator of claim 18 wherein said transformer has a square loop characteristic.

21. The capacitor discharge system of claim 1 wherein said oscillator includes a sensing winding coupled to the output windings, and a protective diode means connected in series with the sensing winding across the input circuit of said transistors, said protective diode means being responsive to a reflected voltage above a selected level to turn said transistors on.

22. In a capacitor discharge ignition system having a capacitor connected to a charging circuit and to a plurality of firing means for a multiple cylinder internal-combustion engine,
   a plurality of paralleled discharge circuits connected across the capacitor and each including a transformer having a primary winding means in series with a triggered switch means, said transformer having secondary winding means, the opposite ends of which are connected to a pair of firing means, and
   a means connected to said triggered switch means to sequentially fire said triggered switch means.

23. A converter circuit, comprising
   a load connection means,
   a power supply connection means,
   a transformer having a primary winding,
   a first transistor having output elements connected in a series circuit including said power supply connection means and said primary winding,
   a second transistor having output elements connected in series with the input elements of the first transistor and the power supply connection means and only a portion of the primary winding, and
   means to periodically energize the input elements of said second transistor.

24. The converter circuit of claim 23 wherein said transformer includes a feedback winding connected in a feedback circuit loop including the input elements of the transistors.

25. The oscillator circuit of claim 24 wherein said first and second transistors are of the same physical construction and having collector elements connected respectively to one end and to an intermediate turn of the primary winding.

References Cited

UNITED STATES PATENTS

| | | | |
|---|---|---|---|
| 3,085,211 | 4/1963 | Jensen et al. | 331—112 XR |
| 3,240,198 | 3/1966 | Loudon et al. | 123—148 |
| 3,263,124 | 7/1966 | Stuermer | 315—209 |
| 3,271,593 | 9/1966 | De Vilbiss | 307—88.5 |
| 3,302,629 | 2/1967 | Shano | 123—148 |
| 3,312,211 | 4/1967 | Boyer | 123—148 |
| 3,316,449 | 4/1967 | Quinn | 123—148 |
| 3,331,986 | 7/1967 | Hardin et al. | 315—209 |

LAURENCE M. GOODRIDGE, *Primary Examiner.*